Sept. 24, 1957  D. W. H. ROTHANG  2,807,462
WINDOW REGULATOR MECHANISM
Filed Aug. 11, 1955  2 Sheets-Sheet 1

D. W. H. ROTHANG
INVENTOR.

BY E. C. McRae
J. R. Faulkner
G. H. Oster

ATTORNEYS

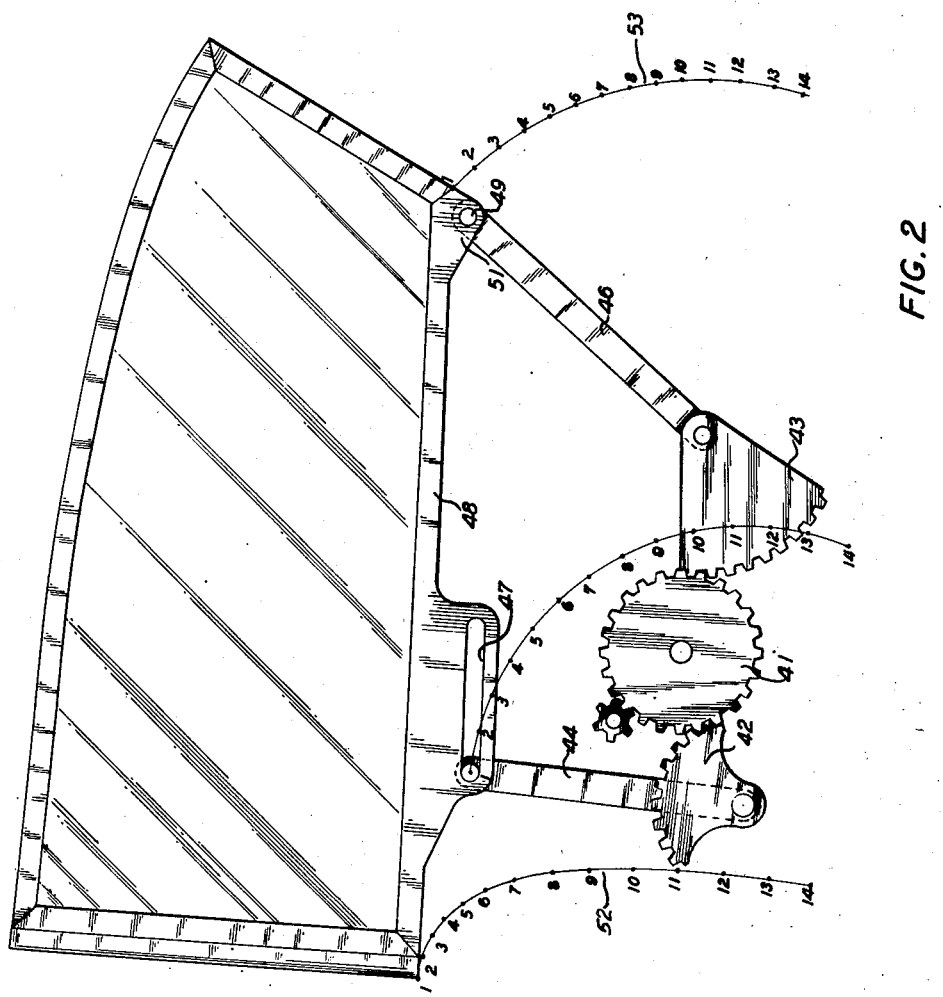

# United States Patent Office 2,807,462
Patented Sept. 24, 1957

2,807,462

WINDOW REGULATOR MECHANISM

Donald W. H. Rothang, Birmingham, Mich., assignor to Ford Motor Company, Dearborn, Mich., a corporation of Delaware Application August 11, 1955, Serial No. 527,782

3 Claims. (Cl. 268—126)

This invention relates generally to window regulators for motor vehicle windows, and has particular reference to window regulator mechanism adapted to control the movement of a vehicle window in a predetermined combined vertical and horizontal path.

An object of the present invention is to provide window operating and guiding structure which will effect an initial rearward movement of the forward portion of a vehicle window during its lowering movement while the rearward portion of the window is moving downwardly, and will subsequently move the forward portion of the window generally vertically downwardly. The present invention achieves this controlled compound window movement by means of a structure relatively simple in construction and inexpensive to manufacture.

Other objects and advantages of this invention will be made more apparent as this description proceeds, particularly when considered in connection with the accompanying drawings, wherein:

Figure 2 is a side elevational view of a modified form of the invention.

Figure 1:
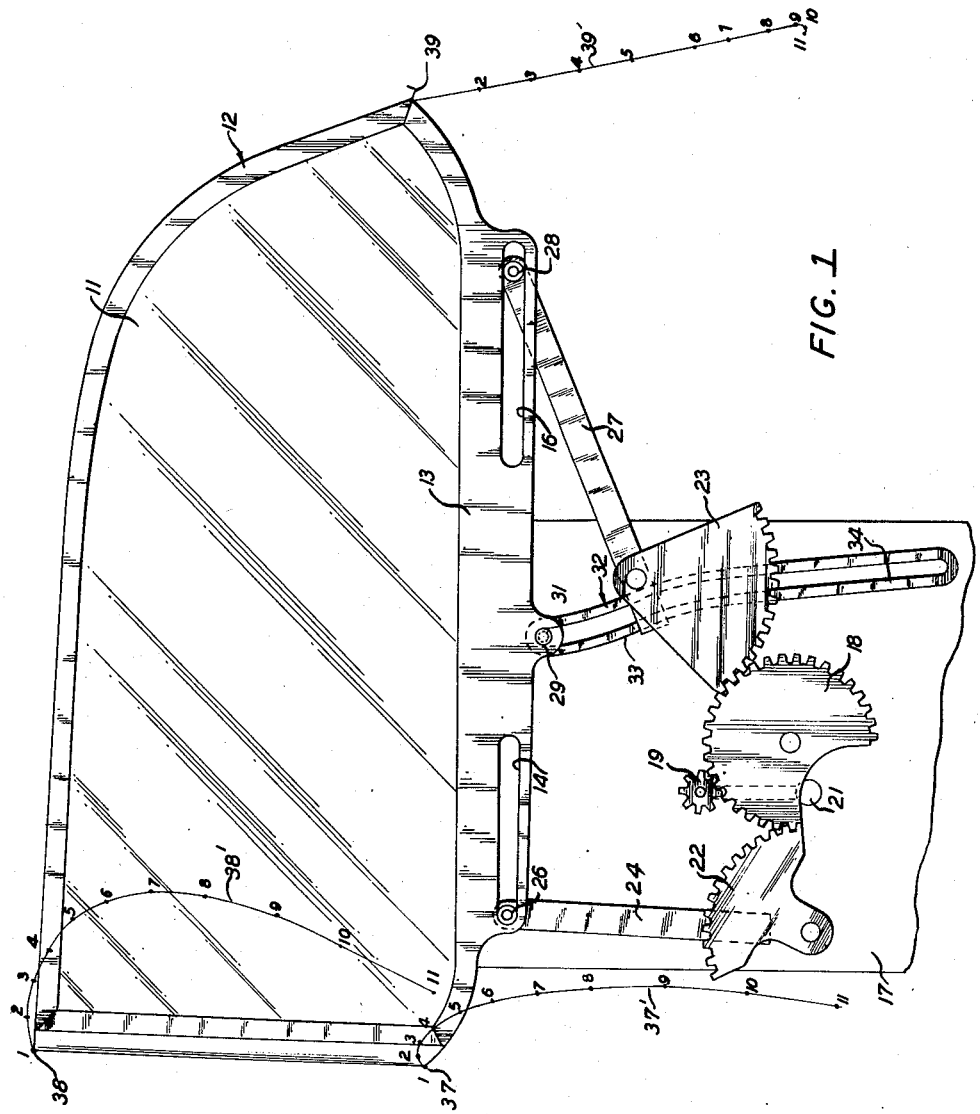
Figure 1 is a side elevational view of the window regulator mechanism of the present invention.

Referring now to the drawings, and particularly to Figure 1, the reference character 11 indicates a motor vehicle window supported within a window frame 12 having a depending flange 13 at the lower portion thereof. The depending flange 13 of the window frame is formed with horizontally extending aligned guideways 14 and 16.

Fixedly mounted within the vehicle body is a supporting panel 17 extending generally vertically. A regulator driving gear 18 is rotatably mounted upon the panel 17 and is rotated by means of a pinion 19 manually operated by means of a handle 21.

A pair of quadrant gears 22 and 23 are rotatably mounted upon the supporting panel 17 on opposite sides of the driving gear 18, with the quadrant gear 22 being located forwardly of the gear 18 and the quadrant gear 23 rearwardly thereof. The quadrant gears 22 and 23 mesh with and are driven by the driving gear 18 so as to be simultaneously rotated in the same direction when the manual handle 21 of the regulator mechanism is operated.

A front regulator arm 24 is rigidly connected to the quadrant gear 22 and extends generally vertically upwardly therefrom in the raised position of the window. At its upper end the regulator arm 24 supports a roller 26 slidable in the front horizontal guideway 14 of the window frame.

A rear regulator arm 27 is fixedly secured to the rear quardant gear 23 and extends generally rearwardly therefrom in a slightly upwardly inclined direction in the raised position in the window. At its rearward end the regulator arm 27 carries a roller 28 slidable within the rear horizontal guideway 16 of the window frame.

The downwardly depending flange 13 of the window frame 12 is centrally formed with a projection 29 rotatably supporting a roller 31. The roller 31 is slidably received within a guideway 32 carried by the supporting panel 17. The guideway 32 extends generally vertically, the upper portion 33 thereof being curved rearwardly and merging into the lower portion 34 which is generally straight and while inclined rearwardly has a more gradual inclination than the upper portion 33.

The lines 36', 37' and 38' plot the paths of the forward lower corner 36, the forward upper corner 37, and the rearward lower corner 38 of the window frame 12 respectively. The numbered positions on the paths indicated successive positions of the lowering movement of the window. When the window is to be lowered, the initial operation of the regulator mechanism results in simultaneous clockwise rotation of the driven quadrant gears 22 and 23 and corresponding clockwise rotation of the regulator arms 24 and 27. Since the front regulator arm 24 extends generally vertically in the raised position of the window its initial movement causes a generally horizontal rearward movement of the pivotal connection 26 between the regulator arm and the front window guideway 14.

At the same time, the generally horizontal and rearwardly extending regulator arm 27 effects an initial downward movement of its pivotal connection 28 with the rear window guideway 16. With the central portion of the window frame being restrained to move along the vertical guideway 32 by reason of the pivotal and slidable connection 31 therewith, it will be seen that the window will be initially rocked about the central pivotal connection 31. As the lowering movement continues, the rearward inclination of the upper portion 33 of the vertical guideway 32 effects a rearward movement of the window which, combined with the rearward and downward movements respectively of the front and rear regulator arms 24 and 27 respectively, causes the lower forward corner 37 of the window to initially move rearwardly and upwardly. This movement becomes generally downward between positions 5 and 6.

The compound horizontal and vertical path of the window enables it to be advantageously used in connection with pillarless four door body types or with other body styles in which a final forward movement of the window in its raised position is advantageous.

The modification shown in Figure 2 similarly utilizes a driving regulator 41 meshing with driven quadrant gears 42 and 43 to actuate front and rear regulator arms 44 and 46 respectively. The front regulator arm 44 is slidably connected at its upper end to a horizontal guideway 47 carried by the window frame 48, while the rear regulator arm 46 is pivotally connected at 49 to a depending flange 51 of the window frame to form a fixed pivotal connection therewith.

During the lowering movement of the window, the pivotal connection 49 between the rear regulator arm 46 and the lower rearward portion of the window frame effects a downward and rearward movement, which, when combined with the initial generally rearward movement of the connection between the front regulator arm 44 and the channel 47, results in moving the window along the paths 52 and 53. It will be noted that this effects an initial rearward movement of the forward portion of the window followed by a subsequent downward movement thereof.

It will be understood that the invention is not to be limited to the exact construction shown and described, but that various changes and modifications may be made without departing from the spirit and scope of the invention, as defined in the appended claims.

What is claimed is:

1. In a window control mechanism for raising and lowering a window in a vehicle body, a regulator driving gear rotatably mounted upon said body, a pair of regulator driven gears rotatably mounted upon said body on opposite sides of said driving gear and each meshing with said driving gear for rotation in a common direction, a regulator arm rigidly attached to each of said driven gears, means connecting the free ends of said regulator arms to the lower portion of said window, one of said regulator arms extending substantially vertically and the other extending substantially horizontally in the raised position of the window so that during the initial lowering movement of said window the part of the window connected to the vertically extending regulator arm moves horizontally while the part of the window connected to the horizontally extending arm moves vertically.

2. The structure defined by claim 1 which is further characterized in that the free end of the horizontally extending regulator arm is pivotally connected to the rearward portion of the window at a fixed point, a horizontal guideway carried by said window adjacent its forward portion, and means slidably interconnecting the free end of the vertically extending regulator arm with said guideway.

3. In a window control mechanism for raising and lowering a window in a motor vehicle body, a pair of longitudinally spaced horizontal guideways on the lower portion of said window, a regulator driving gear rotatably mounted upon said body, a pair of regulator driven gears rotatably mounted upon said body one forwardly of said driving gear and the other rearwardly thereof in a direction longitudinally of the vehicle, each of said driven gears meshing with said driving gear for rotation in a common direction, a regulator arm rigidly connected to the forward driven gear and extending generally vertically therefrom in the raised position of the window, the upper end of said regulator arm being slidably connected to the horizontal guideway at the forward portion of the window, a second regulator arm rigidly connected to the rearward driven gear and extending rearwardly therefrom and substantially horizontally in the raised position of the window, the rearward end of said second regulator arm being slidably connected to the horizontal guideway at the rearward portion of said window, a rearwardly inclined generally vertical guideway on said body, and means carried by the lower portion of said window slidably engaging said vertically extending guideway to co-operate with said regulator arms and horizontal guideways in controlling the path of lowering movement of said window so that the forward portion thereof initially moves rearwardly and subsequently moves downwardly.

References Cited in the file of this patent

UNITED STATES PATENTS

| | | |
|---|---|---|
| 2,131,745 | Morrison | Oct. 4, 1938 |
| 2,144,539 | Lane | Jan. 17, 1939 |
| 2,170,440 | Ackerman | Aug. 22, 1939 |